United States Patent
Fang et al.

(10) Patent No.: US 10,470,192 B2
(45) Date of Patent: Nov. 5, 2019

(54) TRAFFIC PATH CHANGE DETECTION MECHANISM FOR MOBILE EDGE COMPUTING

(71) Applicant: ZTE Corporation, Shenzhen, Guangdong (CN)

(72) Inventors: Yonggang Fang, San Diego, CA (US); Qiang Huang, Guangdong (CN); Bo Sun, Guangdong (CN); JinGuo Zhu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 36 days.

(21) Appl. No.: 15/916,148

(22) Filed: Mar. 8, 2018

(65) Prior Publication Data

US 2018/0263039 A1 Sep. 13, 2018

(30) Foreign Application Priority Data

Mar. 8, 2017 (WO) ................ PCT/CN2017/075989

(51) Int. Cl.
*H04W 72/04* (2009.01)
*H04W 72/08* (2009.01)

(52) U.S. Cl.
CPC ... *H04W 72/0493* (2013.01); *H04W 72/0486* (2013.01); *H04W 72/087* (2013.01)

(58) Field of Classification Search
CPC ..... H04L 12/1407; H04L 41/00; H04L 47/18; H04L 47/803; H04L 47/822; H04L 47/824; H04L 65/80; H04L 67/04; H04L 67/10; Y02D 70/00; Y02D 70/10; Y02D 70/12; Y02D 70/122; Y02D 70/1224; Y02D 70/1242; Y02D 70/1244; Y02D 70/1246; Y02D 70/1262; Y02D 70/1264; Y02D 70/142; Y02D 70/144; Y02D 70/146; Y02D 70/162; Y02D 70/164; Y02D 70/166; Y02D 70/21; Y02D 70/22; Y02D 70/23; Y02D 70/26
USPC ........................................................ 370/329
See application file for complete search history.

(56) References Cited

U.S. PATENT DOCUMENTS

2018/0049179 A1* 2/2018 Shah ....................... H04L 67/12

* cited by examiner

*Primary Examiner* — Natasha W Cosme
(74) *Attorney, Agent, or Firm* — Perkins Coie LLP (57) ABSTRACT

Disclosed are methods, devices and systems for detecting data traffic path change of UE when it is being served by an Internet application instance running on a mobile edge host, and moves to the coverage area of another mobile edge host in mobile edge computing system. One exemplary method includes receiving an application resource request for a cloud-computing services from a user equipment (UE), and allocating resources at a mobile edge computing platform to the application resource request in lieu of a server of the cloud-computing services that is reachable via an internet connection. Examples of the disclosed technology may rely on packet header information in downlink or uplink traffic received by mobile edge host, and may be a detection method independent of the signaling notification in the underlying bearer network.

30 Claims, 10 Drawing Sheets

| Attribute | Cardinality | Content | Description |
|---|---|---|---|
| trafficRuleId | 1 | String | Identifies the traffic rule. |
| filterType | 1 | Enum | Definition of filter per flow or per packet If it is per flow, the filter matches UE->EPC packets and the reverse packets are handled by the same context |
| trafficFilter | 1..N | TrafficFilter | The filter used to identify specific flow/packets that need to be handled by the MEC host. |
| action | 1 | Enum | Identifies the action of the ME host data plane, when a packet matches the trafficFilter: <br> 1. DROP, <br> 2. FORWARD, <br> 3. DECAPSULATED <br> 4. NOTIFICATION OF TRAFFIC PATH CHANGE DETECTED |

FIG. 5

| Attribute | Cardinality | Content | Description |
|---|---|---|---|
| srcAddress | 0..N | String | An IP address or a range of IP addresses. For IPv4, the IP address could be an IP address plus mask, or an individual IP address, or a range of IP addresses. |
| dstAddress | 0..N | String | A IP address or a range of IP addresses. For IPv4, the IP address could be an IP address plus mask, or an individual IP address, or a range of IP addresses. |
| srcPort | 0..N | String | A port or a range of ports. |
| dstPort | 0..N | String | A port or a range of ports. |
| protocol | 0..N | String | Specify the protocol of the traffic filter. |
| token | 0..N | String | Used for token based traffic rule. |
| srcTunnelAddress | 0..N | String | Used for GTP tunnel based traffic rule. |
| tgtTunnelAddress | 0..N | String | Used for GTP tunnel based traffic rule. |
| srcTunnelPort | 0..N | String | Used for GTP tunnel based traffic rule. |
| dstTunnelPort | 0..N | String | Used for GTP tunnel based traffic rule. |
| qCI | 0..1 | Int | Used to match all packets that have the same QCI. |

FIG. 6

| Attribute | Cardinality | Content | Description |
|---|---|---|---|
| interfaceType | Enum (inlined) | 1 | Type of the interface, e.g., TUNNEL, MAC, IP, etc. |
| tunnelInfo | TunnelInfo | 0..1 | Included only if the destination interface type is "tunnel" |
| srcMacAddress | String | 0..1 | If the interface type is "MAC", source address identifies the MAC address of the interface |
| dstMacAddress | String | 0..1 | If the interface type is "MAC", destination address identifies the MAC address of the interface. |
| srcIpAddress | String | 0..1 | If the interface type is "IP", source address identifies the IP address of the local interface. |
| dstIpAddress | String | 0..1 | If the interface type is "IP", destination address identifies the IP address of the remote destination. |

TRAFFIC PATH CHANGE DETECTION MECHANISM FOR MOBILE EDGE COMPUTING

CROSS REFERENCE TO RELATED APPLICATIONS

This patent document claims the benefit of priority under 35 U.S.C. § 119(a) and the Paris Convention of International Patent Application No. PCT/CN2017/075989, filed on Mar. 8, 2017. The entire content of the before-mentioned patent application is incorporated by reference as part of the disclosure of this patent document.

TECHNICAL FIELD

This document is directed generally to wireless communications, and specifically to mobile edge computing and mobile computing systems.

BACKGROUND

Mobile Edge Computing (MEC) is a network architecture concept that provides shared computing resource, data storage and/or others for running multiple Internet applications. MEC, as comparing to cloud computing, enables computing capabilities and an IT service environment at the edge of the cellular network. MEC systems run applications and perform related processing tasks closer to the cellular customer, thereby reducing network congestion and resulting in applications perform better.

SUMMARY

This document relates to methods, systems, and devices for detecting data traffic path change of UE when it is being served by an Internet application instance running on a mobile edge host, and moves to the coverage area of another mobile edge host in mobile edge computing system.

A traffic path change detection method is a special service at mobile edge host to detect the traffic path change of UE. The traffic path change detection methods can detect UE's UL traffic toward the original mobile edge host or DL traffic from the original mobile edge host to the UE attaching to another mobile edge host. It can be used to trigger the service relocation for optimizing performance of service to the UE. The traffic path change detection mechanism is an independent method of detecting applications' traffic, which is different from the signaling notification sent by the underlying bearer network.

In one exemplary aspect, a wireless communication method is disclosed. The method includes receiving an application resource request for a cloud-computing services from a user equipment (UE), and allocating resources at a mobile edge computing platform to the application resource request in lieu of a server of the cloud-computing services that is reachable via an internet connection, where a data latency between the UE and the mobile edge computing platform is less than a data latency between the UE and the server of the cloud-computing services at least due to proximity of the mobile edge computing platform to the UE.

In another exemplary aspect, a method of detecting traffic path change is provided via creating a special application instance running on the virtualization infrastructure machine of mobile edge computing host.

In yet another exemplary aspect, a method of detecting traffic path change is provided via using one or more traffic filters running on the data plane of virtualization infrastructure to detect the pattern of traffic transmitted from or to neighbor mobile edge hosts over underlying bearer network. The traffic filter consists of attributes of source IP address, destination IP address, source port, destination port, or MAC addresses which are used to identify the applications' traffic from or to neighbor mobile edge hosts.

In yet another exemplary aspect, a method of configuring traffic filters of traffic path change detection is provided via setting a traffic filter's attributes to the IP addresses or MAC addresses of neighbor mobile edge host. The mobile edge orchestrator, coordinating mobile edge hosts in the mobile edge computing system, configures the traffic detection rule of traffic path change detection application instance through the mobile edge platform manager and virtualization infrastructure manager.

In yet another exemplary aspect, a method of notification for detected traffic path change is provided to the mobile edge platform and other registered application instances to inform them that a change in a UE's traffic path is detected. Thereafter, a mobile edge platform can take further actions such as relocating the application instance being served to the UE to another mobile edge host with better QoS (quality of service) or lower latency.

In yet another exemplary aspect, a method of traffic path change detection can be implemented as a basic service of mobile edge host to trigger optimizing services produced by application instances to UEs in the mobile edge computing system.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

This document describes techniques, mechanisms, devices, and systems for detecting traffic path change in the mobile edge computing environment due to user equipment's movement in the underlying bearer network.

Mobile Edge Computing (MEC) or fog computing is a computing environment which could be located at the access point or gateway of packet data communication network. MEC offers the shared environment of computing resource, storage resource and other resource to run applications to provider better services to end users. Compared to cloud computing, MEC is closer to end user equipment (UE) that are consuming Internet services, and can provide services with lower latency and better QoS (quality of service).

An MEC system can be based on network function virtualization framework. The concept of network function virtualization is to encapsulate the complexity of underlying bearer network, computing hardware and varieties of storage, and offer unified software interfaces to applications. Therefore, the MEC system could use a generic APIs of computing resources to support the operation of Internet applications, regardless of what the hardware infrastructure is.

An MEC system may evolve towards the platform as a service (PaaS) model, which features a couple of basic services, like radio network information service, DNS service, location service, and the traffic path change detection service disclosed by this patent application.

This document describes, among other things, a method of notification for detected traffic path change is provided to the mobile edge platform and other registered application instances to inform them that a change in a UE's traffic path is detected. Thereafter, a mobile edge platform can take further actions such as relocating the application instance being served to the UE to another mobile edge host with better QoS (quality of service) or lower latency.

Furthermore, embodiments may implement a method of traffic path change detection can be implemented as a basic service of mobile edge host to trigger optimizing services produced by application instances to UEs in the mobile edge computing system.

Figure 1:
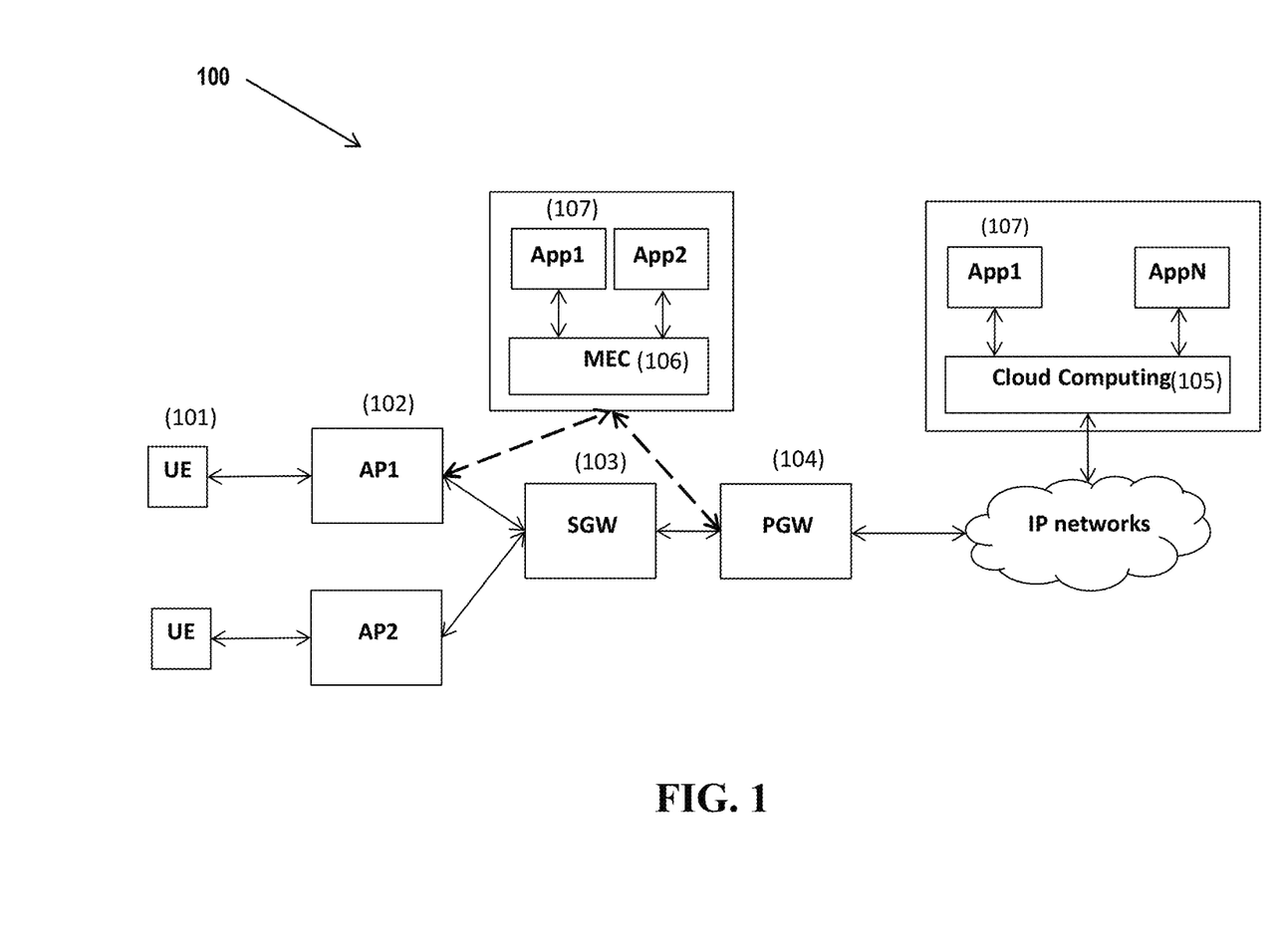
FIG. 1 shows an example of wireless communication network with Internet services running on the cloud computing and/or mobile edge computing system.

FIG. 1 illustrates an example of a wireless communication system 100 with cloud computing and mobile edge computing systems. As shown therein, the wireless communication system may include:

a User Equipment (UE) (101) is a wireless device which is used to access a wireless access point such eNodeB of 3GPP radio access network, or WiFi AP of WLAN, etc.;

an Access Point (AP) (102) of a radio access network provides the air interface to a mobile device (UE). The access point could be an eNodeB, small cell AP, or femto AP in 3GPP network or a WLAN of IEEE802.11 network;

a Serving Gateway (SGW) (103) that is a network entity connected to APs and a packet data network (PDN) gateway PGW (104). It routes/forwards user data packets between AP and PGW, and acts as the mobility anchor for the user plane during inter-AP handovers and as the anchor for mobility between 3GPP and other technology networks. The SGW aggregates UL traffic from multiple APs and sends to the PGW, and distributes DL traffic from the PGW to different APs; and the PDN gateway (PGW) (104) that is an anchor point for IP traffic, providing connectivity from UE to external packet data networks. In order to provide traffic security and integrity, the PGW uses GTP (GPRS tunneling protocol) to tunnel DL traffic to SGW. SGW also uses the GTP to tunnel UL traffic to PGW. The PGW performs policy enforcement, packet filtering for each user, lawful interception and packet screening. It also acts as the anchor point for mobility between 3GPP and non-3GPP technologies such as trusted WLAN, and provides DHCP (Dynamic Host Configuration Protocol) functionality for IP address assignment to UEs and DNS for domain name search.

The wireless communication network provides at least basic IP connectivity through the bearer network for other network entities that host applications for various Internet services.

Internet service is typically provided by IT companies and can be delivered to UE over the wireless communication network, e.g. through PGW to SGW to AP to UE. To better serve end users, IT companies may use cloud computing environment to run many applications over the shared computing resource for better performance.

A cloud computing platform (105) is a type of Internet-based cloud computing environment that provides shared computing resources and data to other computing devices. It can enable a flexible computing environment and resources based on on-demand services, and release them after the service completes. Therefore, the cloud computing platform could optimize computing resource utilization and deliver services with better performance to end users. In addition, the cloud computing platform can offer an opportunity to third-party service providers with various capabilities to store and process data serving their customers.

However, as Internet services are located at the cloud, they may be far away from end users who consume services. Therefore, the service traffic may experience a long delay over the wireless communication network before arriving to a UE. Sometimes, the service delay may be over a couple of hundreds milliseconds, and cause QoS issue for latency-sensitive services. One solution to address this QoS issue is to increase the bandwidth of wireless communication networks so that the network could have some reserved bandwidth for a certain high QoS services. But this solution may only partially solve QoS issue for delay sensitive services when the wireless communication network encounters congestion. For delays caused by transmission propagation and data packet processing by network entities, the bandwidth increment may not be very helpful. In addition it may cost a lot for network service provider to increase bandwidth of the wireless communication network.

Another possible solution for reducing service delays for latency sensitive services is to move such Internet services to a location close to end users who consume such services, e.g. running such application instances in virtual machine environments on the MEC system (106) shown in FIG. 1.

MEC is a computing environment that offers multiple applications the ability to share computing resources. Typically, an MEC system is installed at a location close enough to the end users, so that an application running on the MEC system could provide best services to end users. An MEC system may be located with an AP through a local gateway (LGW), or located at the PGW as shown in FIG. 1. As applications (or application instances) running on the MEC system are very close to the end users, the service latency caused by the transmission over the underlying bearer network and data processing by the network entities would be significantly reduced comparing to the same service running at the cloud.

Figure 2:
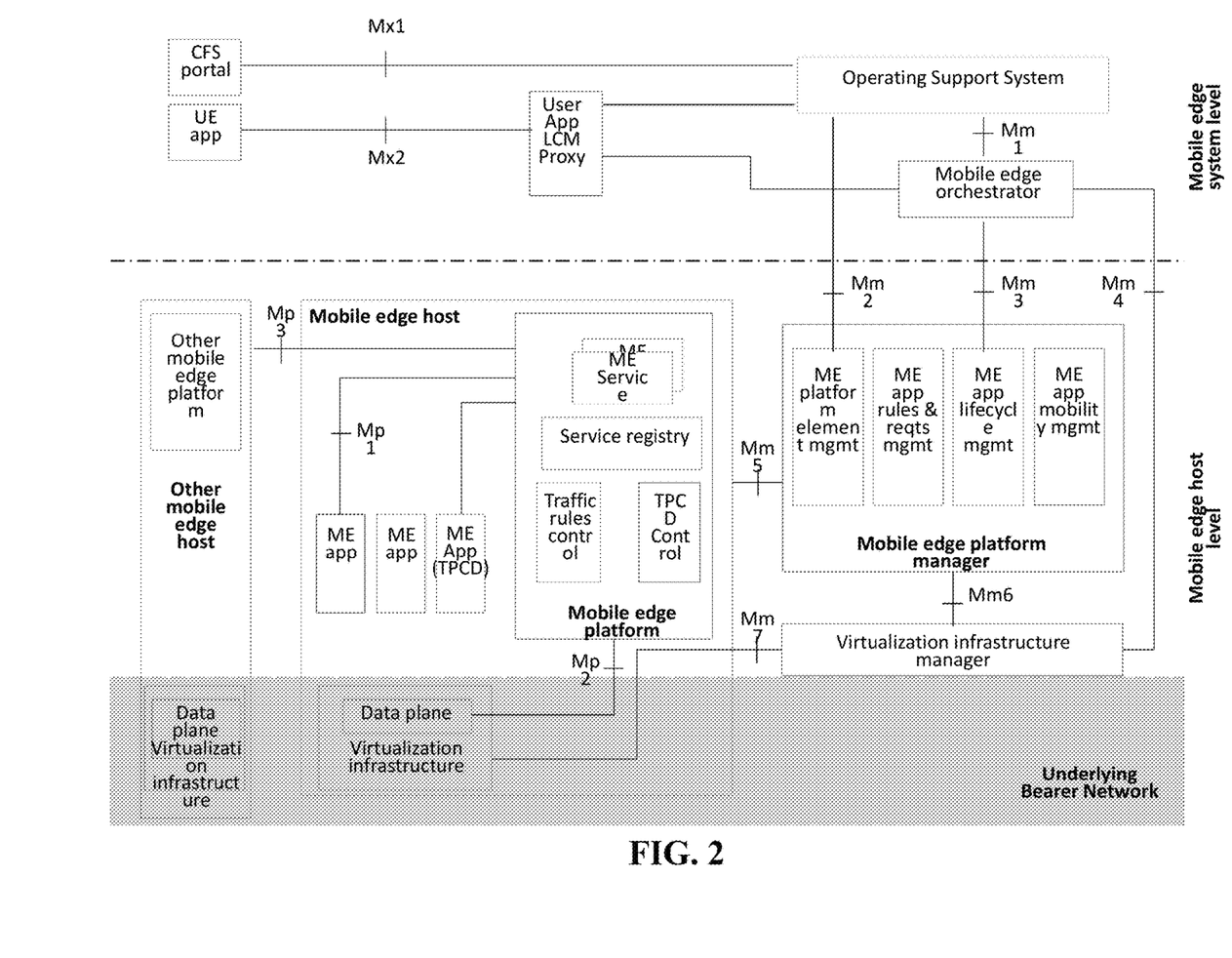
FIG. 2 shows an example of mobile edge computing (MEC) architecture including functional entities and reference points.

FIG. 2 shows an example of MEC architecture. An MEC system can be based on network function virtualization and, in an example, may include functional entities with standardized reference points:

The UE app is an application client running on UE to communicate the application instance running on the MEC system to receive a service.

The ME operating support system and orchestrator (MEO) is a manager on ME system level to manage mobile edge entities within the MEC system.

The ME Host (MEH) is an entity that contains a mobile edge platform and a virtualization infrastructure which provides compute, storage, and network resources, for running mobile edge application instances.

The ME platform manager (MEPM) and virtualization infrastructure managers (VIMs) are ME host level management entities. They handle the management of the ME specific functionality of a particular ME host and applications running on it.

Additional reference points include interfaces that may include:

Mx is an interface of MEC to external entity. In FIG. 2, two such interfaces Mx1 and Mx2 are shown.

Mp is an interface of MEP to another network functional entity in MEC. In FIG. 2, two such interfaces, Mp1 and Mp2 are shown.

Mm is an interface of ME management to control and manage the MEH. In FIG. 2, seven interfaces, listed Mm1 to Mm7 are shown.

The mobile edge host (MEH) may include some of the following functional entities:

The ME Platform (MEP) that is a collection of functionality used to run mobile edge applications on a particular virtualization infrastructure and enable them to provide and consume mobile edge services. In various embodiments, the present document refers to the MEP as a mobile edge computing platform.

The Virtualization Infrastructure (VI) offers a virtual computing environment to run applications, which includes a data plane that executes the traffic rules received by the mobile edge platform, and routes the traffic among applications, services, DNS server/proxy, 3GPP network, local networks and external networks.

ME Applications are instantiated on the virtualization infrastructure of MEH based on configuration or requests validated by the mobile edge management.

When a UE attaches to an AP in an underlying bearer network, which is connected to an MEH offering various Internet services, it may start a service request (which may be referred to as an application resource request), like browsing a web. The service request may be routed to the cloud and then redirected by the cloud to an MEH which is close to the UE, or directly routed to an MEH by the software-defined networking (SDN) functionality of the MEH. As result the service request from UE is routed to an MEH. If no application instance is running for the service requested by the UE on the MEH, the MEPM/VIM may instantiate an application on the MEH and produce a service to the UE. Therefore, the UE may consume the service provided by the application instance on the MEH with lower latency and better QoS than the one provided from the cloud.

In a wireless communication network, a UE consuming a service produced from an application instance on an MEH can move from one location to another; for example, from attaching to AP1 to attaching to AP2 as shown in FIG. 1. If an MEH is associated to an AP, such movement by the UE could cause the traffic path change, and may trigger service relocation to another MEH so that UE can continue receiving the best service from a nearby MEC.

Figure 3:
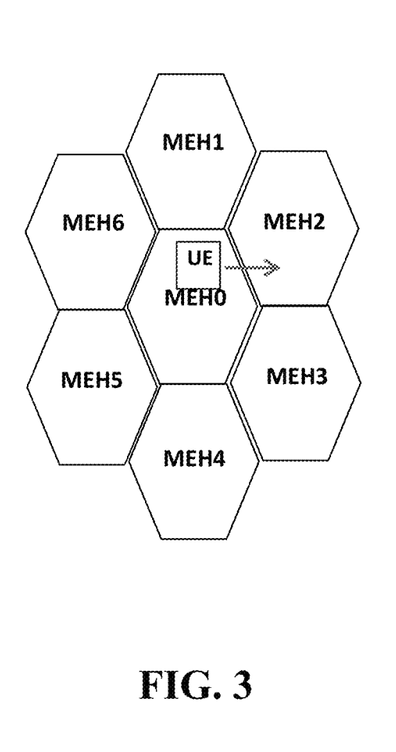
FIG. 3 shows an example topology of mobile edge computing system.

FIG. 3 shows an example topology of mobile edge (or mobile edge computing) system. The mobile edge system may include several MEHs, e.g. MEH0 to MEH6, which are inter-connected by the underlying bearer network, and controlled by MEO through MEPM/VIM. From a service point of view, each MEH covers a particular serving area, and multiple MEHs form a complete coverage area of services to UEs. When a UE moves through the underlying bearer network, it could result in the traffic path change from one serving area to another serving area. This traffic path change may trigger application mobility, which moves the application instance from the current serving MEH to a new MEH for better service to the UE. The application mobility also needs to maintain continuity of the UE service.

Figure 4:
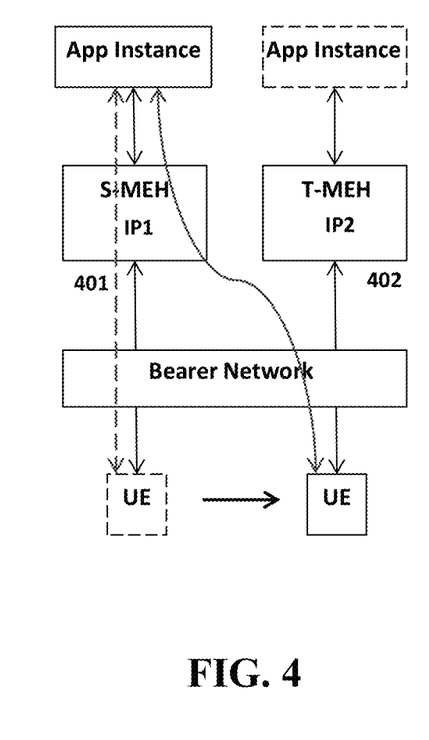
FIG. 4 shows an example of UE movement in underlying bearer network causing the traffic path change.

FIG. 4 shows an example of traffic path change due to a UE's movement in the underlying bearer network. Initially, the UE attaches to AP1 in underlying bearer network. A source MEH (S-MEH), which offers the mobile edge computing environment, is connected to AP1 and provides services produced by application instances to the UE. S-MEH has an IP address, MEH-IP1. When the UE moves out of coverage area of S-MEH to AP2, which is connected to another MEH, e.g. target MEH (T-MEH) with IP address MEH-IP2, downlink (DL) traffic of service offered by the application instance at S-MEH is delivered to the UE by the underlying bearer network, while uplink (UL) traffic from UE when attaching to T-MEH is routed to the application instance at S-MEH by T-MEH.

In a multi-session scenario, a UE may keep an old IP session on the source MEH and establish a new IP session at T-MEH during movement in underlying bearer network. Therefore, some traffic might be transmitted through the old session and some traffic might be sent over the new session.

However, the service produced by an application instance running at S-MEH may not be the best one because the same application instance could be run at a new MEH that is closer to the UE. Therefore, the detection of UE traffic path change would be helpful in identifying the best ME host to serve the UE and trigger application mobility.

Traffic path change detection may be implemented by a special application of traffic path change detection (TPCD) running at a MEH. An MEPM may instantiate the application of traffic path change detection through the VIM. The application instance of TPCD running on the VI of the MEH provides a basic service of traffic path change detection to the MEP and other registered application instances. Once the application instance of TPCD detects the traffic path change from the UE, it may send a notification of TPCD to trigger ME optimization of services to the UE.

Referring back to FIG. 2, a special ME application instance of TPCD is created per MEH, and run on the VI to examine the pattern of traffic over the data plane. After creating an application instance of TPCD, the MEPM may configure an instance to provide TPCD service.

Figure 5:
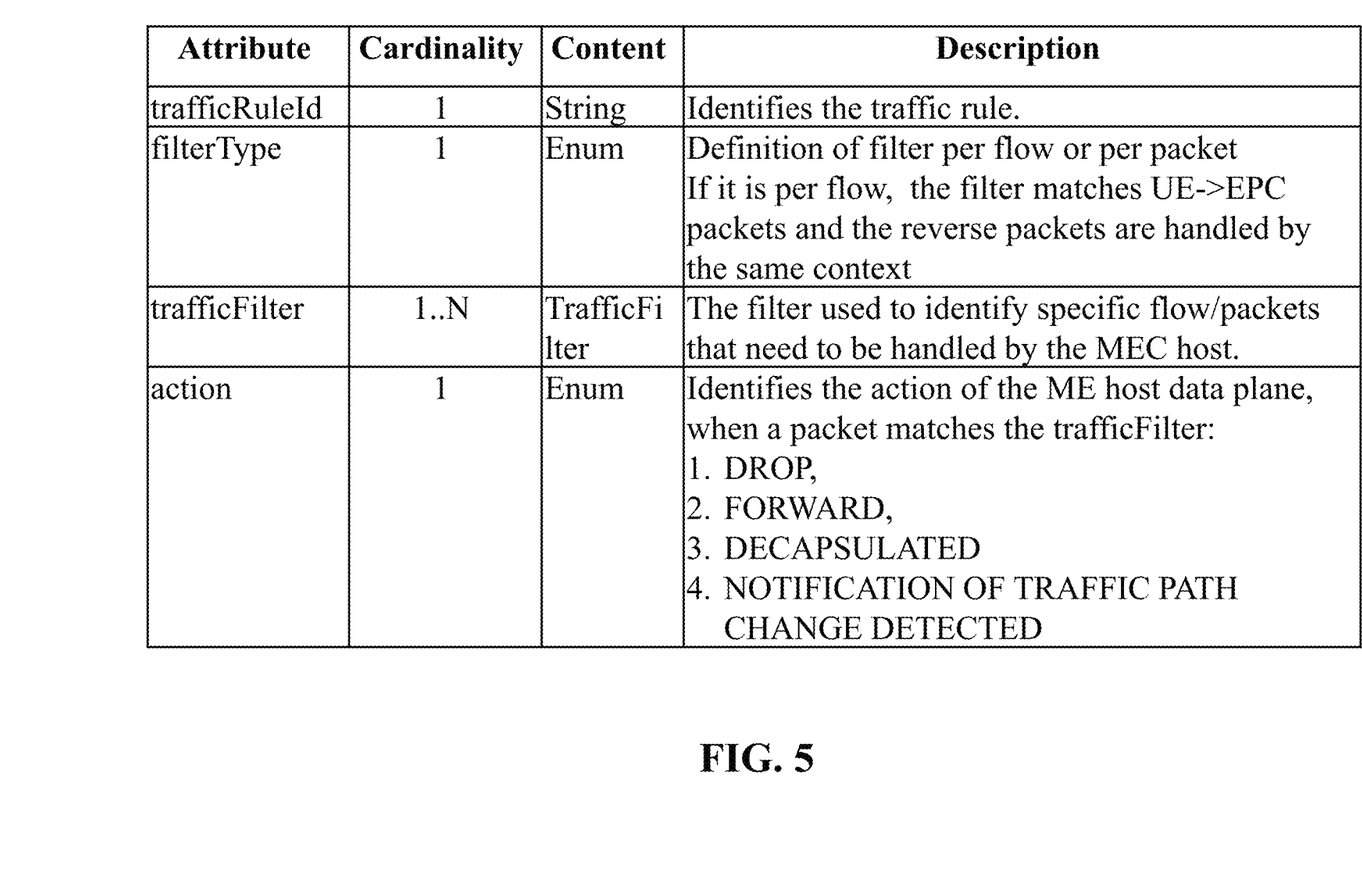
FIG. 5 shows an example of traffic rules descriptor.

For example, an application instance, identified by AppinstId=TPCDId, may be associated to a TrafficRuleDescriptor. FIG. 5 shows some of the attributes of an application instance. As shown therein, the trafficRuleId field is used to identify this traffic rule. For traffic path change detection, it can be assigned to a unique ID:

trafficRuleId=trafficPathChangeDetectionId.

The trafficFilter field describes the filter to be used in the data path to examine the pattern of traffic received in the virtualization infrastructure. Once the traffic pattern is identified as matching the filter criteria, the data plane triggers an action associated to the TrafficRuleDescriptor. A TrafficRuleDescriptor can contain one or more trafficFilter fields to match different traffic pattern carried on the data plane.

The action field is to define the action to be taken when the trafficFilter criteria are met during filtering the UE traffic over data plane of MEH. For the traffic path change detection service, the action of application instance is configured to send a notification of traffic path change detection if the received traffic meets the criteria of traffic filter of the traffic path change detection. Other actions, like FORWARD, may be used for the traffic rule descriptor of the data packet routing service.

Figure 6:
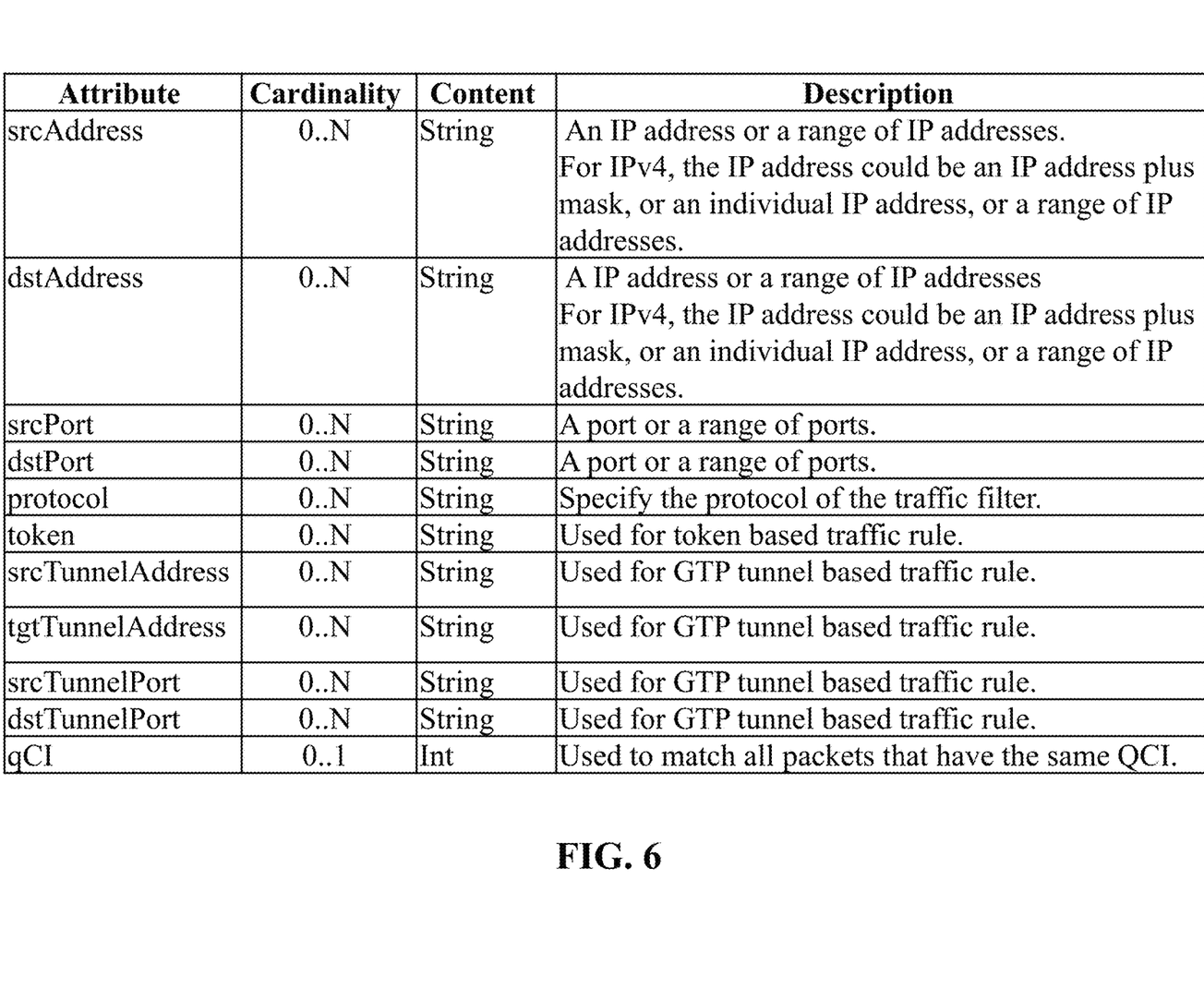
FIG. 6 shows an example of traffic filter information.

FIG. 6 shows an example of TrafficFilter information. The traffic filter uses attributes to identify the traffic pattern over the data plane, and includes the following attributes:
1) srcAddress: an IP address or a range of IP addresses;
2) dstAddress: an IP address or a range of IP addresses;
3) srcPort: a port or a range of ports;
4) dstPort: a port or a range of ports;
5) srcTunnelAddress;
6) dstTunnelAddress;
7) srcTunnelPort; and
8) dstTunnelPort.

Figure 7:
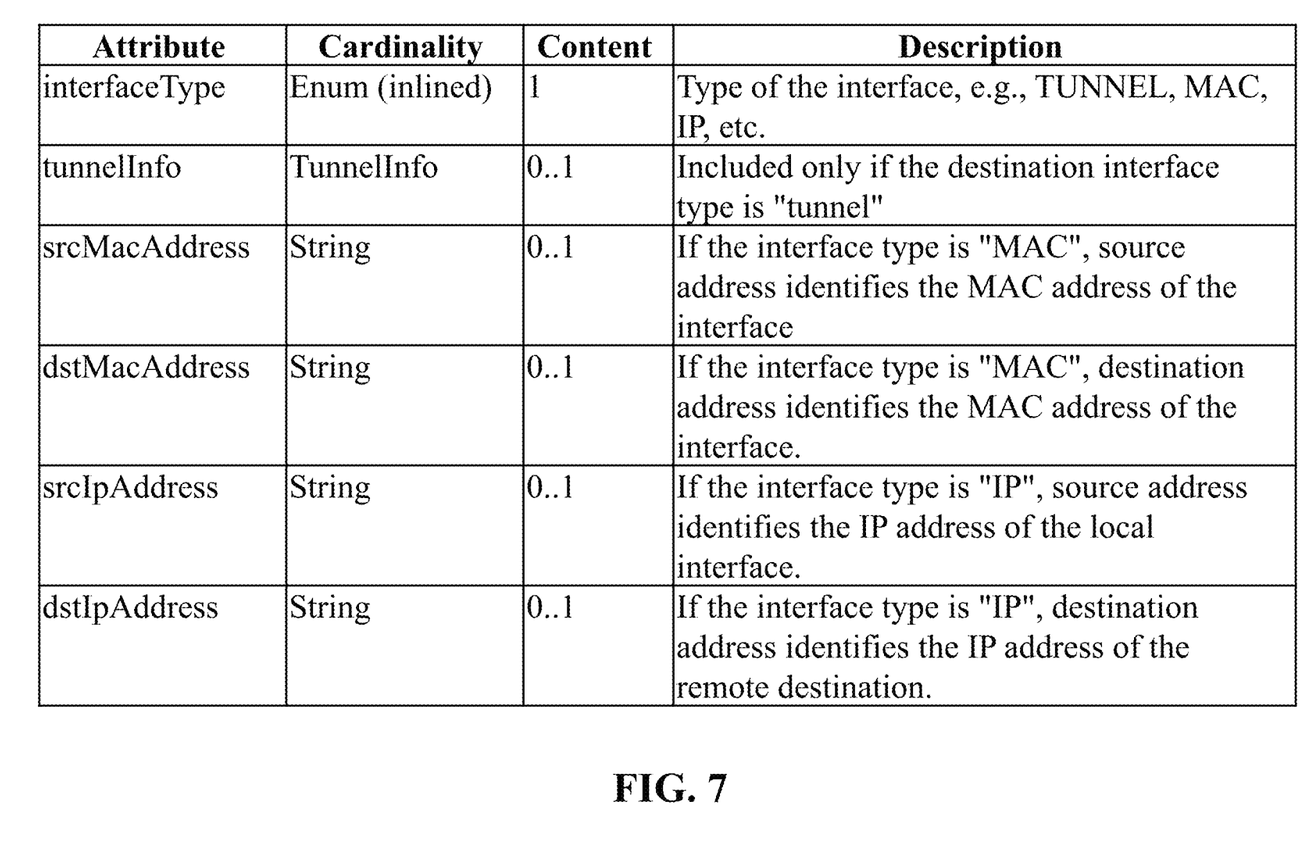
FIG. 7 shows an example of a destination interface.

FIG. 7 shows exemplary attribute information for tunnel, MAC or IP-based interface.

In some embodiments, and in order to detect the traffic path change caused by UE's movement, the MEPM can set the srcAddress and dstAddress to the neighbor MEH's IP address. Therefore, when a neighbor MEH (such as an S-MEH) forwards a data packet to UE attaching to the MEH (e.g. T-MEH), the traffic filter running on the target data plane (T-DP) can filter out packets with srcAddress=S-MEH's IP address. If the MEH (e.g. T-MEH) detects a UL traffic sent from a UE attaching to T-MEH to another MEH (e.g. S-MEH), it filters out the UL packet with dstAddress=S-MEH's IP address. Therefore it can trigger the notification of traffic path change detection to the T-MEP for further actions, like service relocation to move the application instance being served to the UE from S-MEH to T-MEH for optimizing QoS of service to UE. In other embodiments, the traffic path detection could be based on the source MAC address and destination MAC address of the application traffic.

Figure 8:
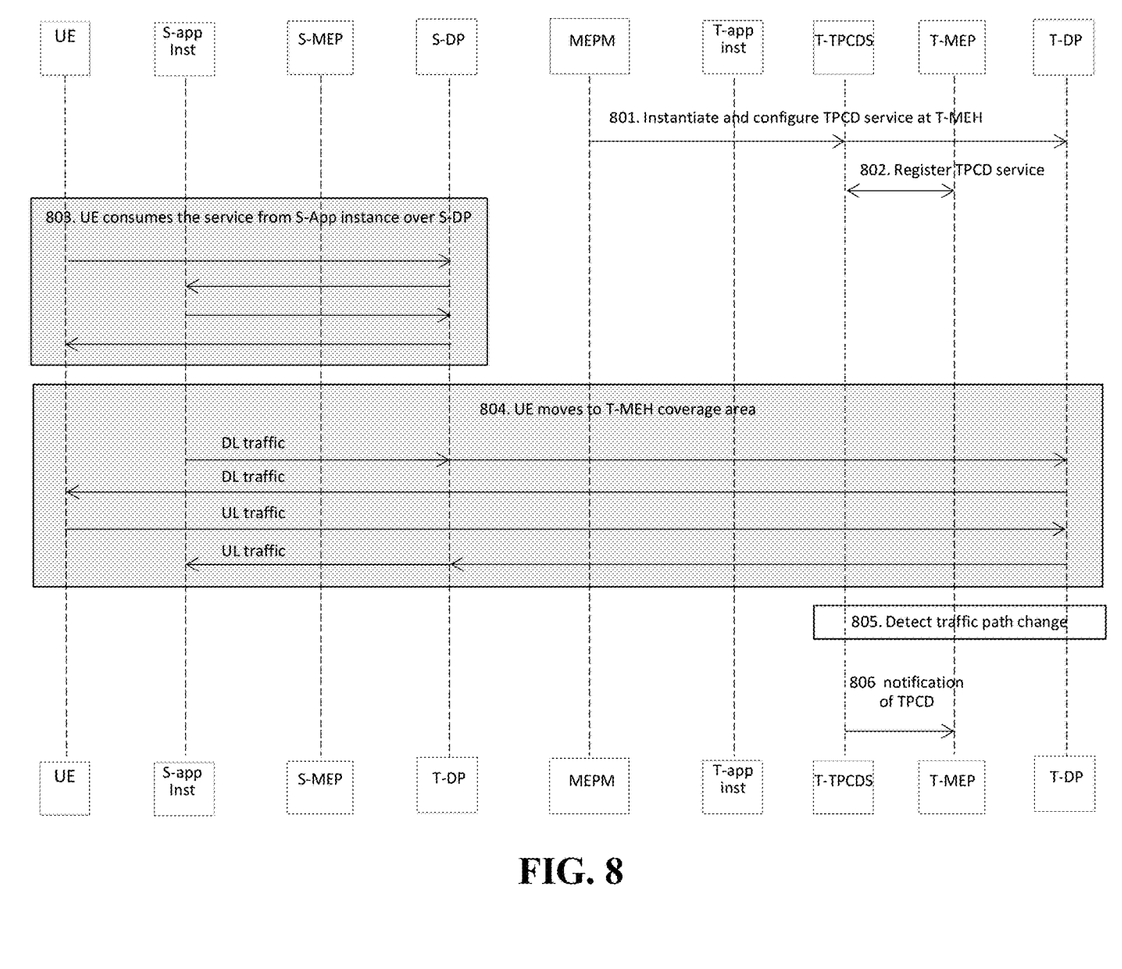
FIG. 8 shows an example procedure for detecting a traffic path change.

FIG. 8 shows an example of traffic path change detection flow.

At step 801, and during the MEC system establishment, the MEO sends a command to the MEPM to instantiate the TPCD application instance at each MEH via VIM. Once the MEPM receives the command from MEO, it starts instantiating an application instance of TPCD on VI of MEH, and configures its traffic path change detection rule with received parameters (such as IP address of neighbor MEHs) from the MEO. Note this figure only shows the instantiation of TPCD application at T-MEH. It may be instantiated at any MEH, which is controlled and managed by MEO. Once the TPCD application instance is running and providing service, it sends a notification in T-MEH.

At step 802, the T-MEP registers the service of TPCD with the T-TPCD system.

At step 803, when a UE attaches to the AP connected to S-MEH, it may start a service request and consume the service offered by an application instance running at S-MEH.

At step 804, the UE may move out of service area of S-MEH to service area of T-MEH. If the UE's IP address is not changed after moving into service area of T-MEH, the UE may continue consuming the service being served by application instance at S-MEH when the T-MEH is has been configured to forward the UE traffic to its neighbor MEH.

At step 805, as the application instance of the TPCD filters the traffic on the T-DP, it can detect the traffic pattern from a neighbor MEH (e.g. S-MEH) to the UE attaching to T-MEH, and/or from UE attaching to T-MEH to S-MEH.

At step 806, if the UE's traffic path change is detected, the T-TPCD system transmits a notification of the TPCD to the T-MEP or other registered application instances. Then T-MEP may trigger consequent action like relocating the service to the UE from S-MEH to T-MEH.

Figure 9:
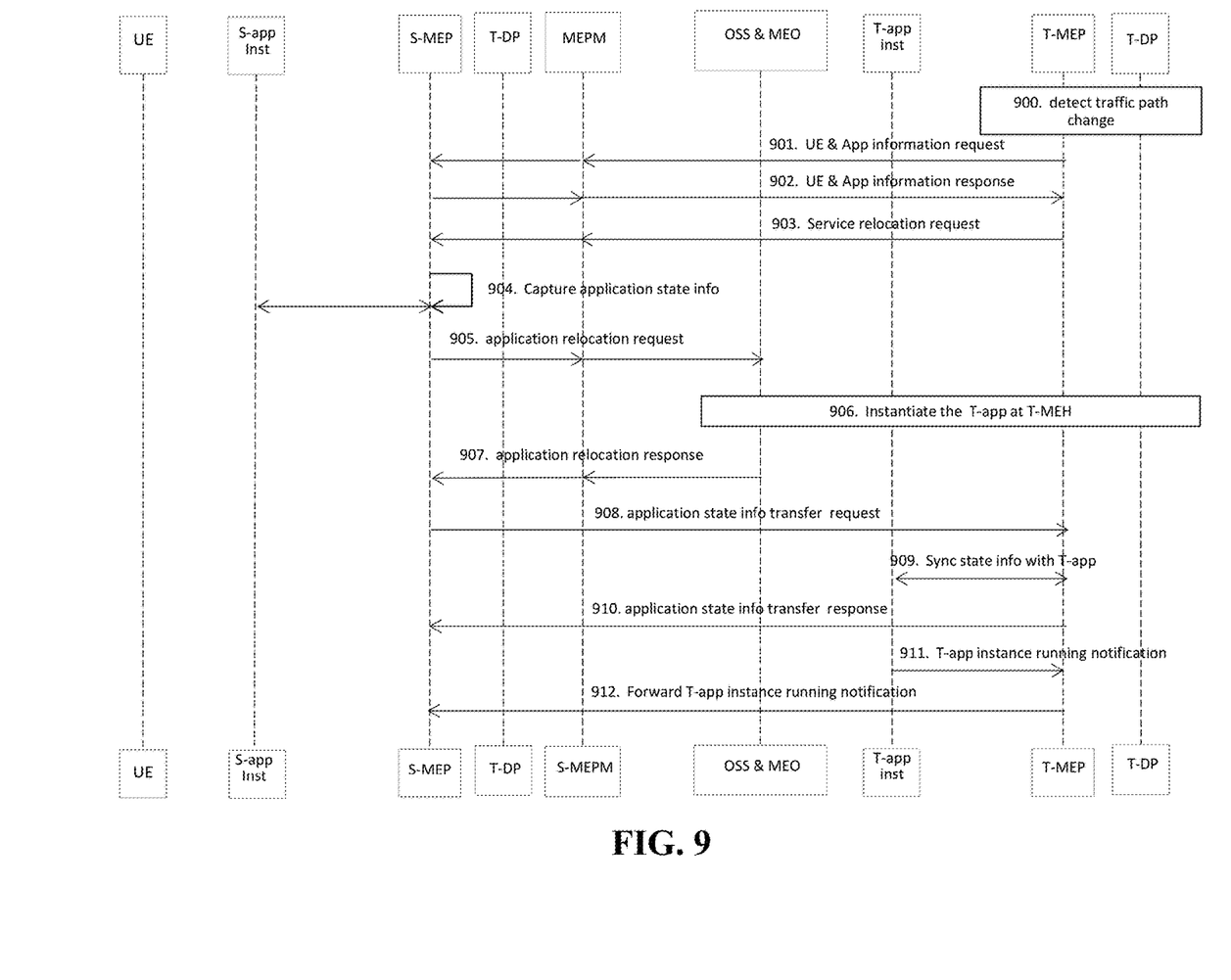
FIG. 9 shows an example signal exchange diagram for relocating a service after detecting a change to a UE's traffic path.

FIG. 9 shows an example of information flow for relocating the service to UE after its traffic path change is detected.

At step 900, the T-MEP receives the traffic path change detection notification from the service of traffic path change detection on the T-MEH.

At step 901, the T-MEP verifies that the traffic of UE is from its neighbor MEH, and sends a query of UE and application information request to the MEPM. The MEPM forwards the request to the corresponding S-MEP.

At step 902, the S-MEP verifies the request and sends a UE and application information response back to MEPM, which forwards to the T-MEP.

At step 903, and on receiving the response of UE and application information, the T-MEP initiates the service relocation request to MEPM for moving the service to UE from S-MEH to T-MEH. The MEPM forwards the service relocation request to the S-MEP.

At step 904, and as the service to UE could be produced by a stateful application instance, the S-MEP informs the application instance to capture the current state so that it can be used to recover the service to UE at T-MEH from that state. For the stateless application, this step could be skipped.

At step 905, the S-MEP sends an application relocation request to MEPM, which is forwarded to MEO/OSS.

At step 906, and once MEO/OSS receives the application relocation request, it authenticates the request, and instantiates an instance of the same application as in S-MEH at T-MEH if the request is authenticated.

At step 907, the MEO/OSS sends an application relocation response back to the MEPM, which is forwarded to S-MEP.

At step 908, and if the application instance is stateful, S-MEP sends an application state information transfer request to T-MEP for stateful application instance to synchronize its operation state. Otherwise, if the application instance is stateless, processing goes to step 911.

At step 909, the T-MEP communicates with the new created application instance (T-App inst) to synchronize its operational state.

At step 910, the T-MEP sends the application state information transfer response to the S-MEP.

At step 911, and once the application instance at the T-MEH is running with the synchronized state, it sends a notification to the T-MEP.

At step 912, the T-MEP forwards this notification to the S-MEP to trigger an action, e.g. terminating the service to UE at S-MEH and releasing the resource allocated to the application instance at S-MEH.

Figure 10:
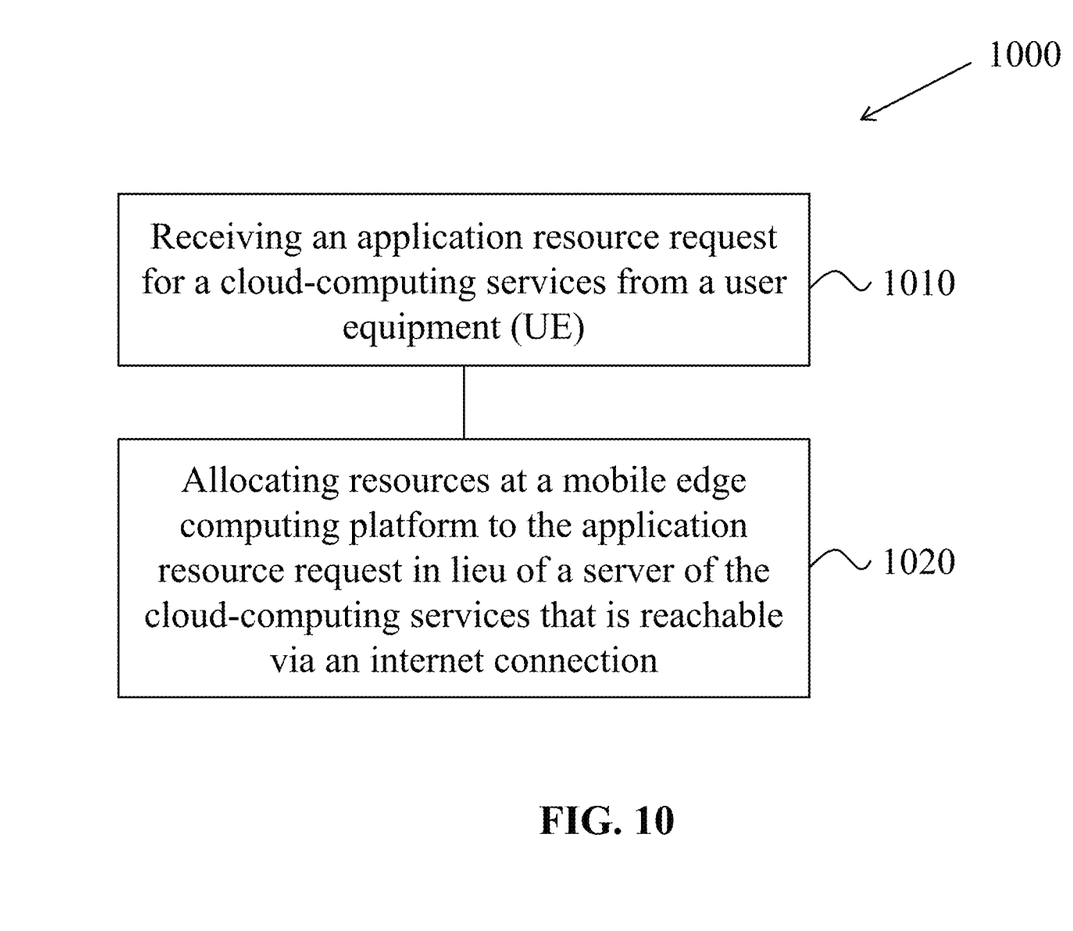
FIG. 10 shows an example of a wireless communication method for detecting a traffic path change.

FIG. 10 shows an example of a wireless communication method 1000 for detecting a traffic path change. The method 1000 includes, at step 1010, receiving an application resource request for a cloud-computing service from a user equipment (UE). As described herein, from the UE's perspective, the service may be located in a cloud computing platform with which the UE is able to communicate via an Internet connection.

The method 1000 includes, at step 1020, allocating resources at a mobile edge computing platform to the application resource request in lieu of a server of the cloud-computing services that is reachable via an internet connection, wherein data latency between the UE and the mobile edge computing platform is less than data latency between the UE and the server of the cloud-computing services at least due to proximity of the mobile edge computing platform with the UE. For example, as described with reference to FIG. 1, a mobile edge computing platform, which may be located at the access point of the bear network or at SGW or PGW, may provide computational, storage or network resource to fulfil the UE's request.

The method 1000 may further include monitoring a traffic path of application data communicated to and from the UE for changes to the traffic path, and when a change is detected in the traffic path, then relocating resources a different mobile edge computing platform for improving latency or quality of service for the application data. The traffic path may change when the UE moves from coverage area of one ME host to another ME host. In another example scenario, the traffic path may change when an application is moved between cloud and a host located at the AP or SGW or PGW. To monitor for traffic path changes, one or more of the following fields may be used using a traffic filter: source address of a data packet, destination address of the data packet, source port of the data packet, destination port of the data packet, source tunnel address of the data packet, destination tunnel address of the data packet, source tunnel port of the data packet and destination tunnel port of the data packets. Various techniques for detecting a traffic path change have been discussed with reference to FIG. 5 to FIG. 9.

In some embodiments, a network-side apparatus for providing a traffic path detection mechanism for mobile edge computing may include one or more memories and one or more processors. The one or more processors read instructions from the one or more memories and execute the instructions to implement the method 1000 and additional features of the method 1000, as described herein.

Figure 11:
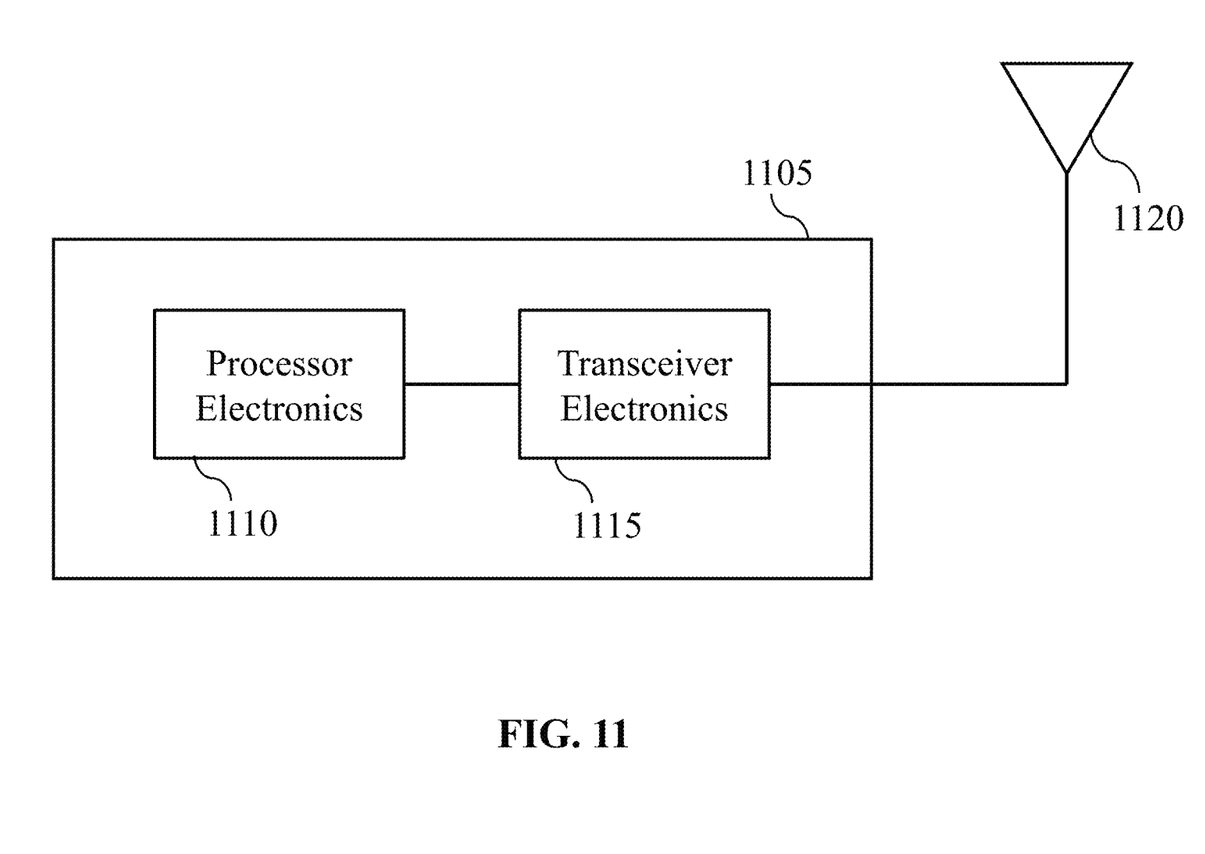
FIG. 11 is a block diagram representation of a portion of an apparatus that may implement a method or technique described in this patent document.

FIG. 11 is a block diagram of an example apparatus 1000 that may implement a method or technique described in this documents (e.g. methods 1000). The apparatus 1105, such as a base station or a wireless device (or UE), can include processor electronics 1110 such as a microprocessor that implements one or more of the techniques presented in this document. The apparatus 1105 can include transceiver electronics 1115 to send and/or receive wireless signals over one or more communication interfaces such as antenna(s) 1120. The apparatus 1105 can include other communication interfaces for transmitting and receiving data. Apparatus 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the apparatus 1105.

Accordingly, an example embodiment may include a system or apparatus (e.g., apparatus 1105 having a processor configured to implement the various techniques described with respect to FIG. 10), that includes a mobile edge computing platform configured to receive an application resource request for cloud-computing services from a user equipment (UE), and allocate resources to the application resource request in lieu of a server of the cloud-computing services that is reachable via an internet connection, wherein a data latency between the UE and the mobile edge computing platform is less than a data latency between the UE and the server of the cloud-computing services at least due to proximity of the mobile edge computing platform to the UE. The mobile edge computing platform may be further configured to monitor a traffic path of application data communicated to and from the UE for changes to the traffic path and upon detecting a change in the traffic path send a notification to a mobile edge orchestrator via the mobile edge computing platform and a mobile edge platform manager, and relocate resources to a different mobile edge computing platform for improving latency or quality of service for the application data. In some embodiments, the monitoring the traffic path comprises monitoring one or more data fields of data packets received from the UE, or sent to the UE, using a traffic filter.

In some embodiments, the traffic filter is configured to monitor at least one of the following fields: source address of a data packet, destination address of the data packet, source port of the data packet, destination port of the data packet, source tunnel address of the data packet, destination tunnel address of the data packet, source tunnel port of the data packet and destination tunnel port of the data packet. In some embodiments, the traffic filter is configured to monitor fields for a specific value or a range of values.

In some embodiments, the system may include a mobile edge platform manager and a mobile edge orchestrator configured to select, from among a plurality of mobile edge hosts, the one or more mobile edge hosts based on at least some parameters of an application for which the application resource request is received. The system may allocate the computational, storage and network resources are allocated from a virtualization infrastructure wherein the virtualization infrastructure performs functions including one or more of executing traffic rules, routing traffic among various applications running on the virtualization infrastructure, and providing domain name service to data traffic.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, the mobile edge computing platform, the traffic filter, mobile edge hosts, mobile edge platform manager, may be implemented partly or completely in hardware, partly or completely in software or partly in hardware and partly in software. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   receiving an application resource request for cloud-computing services from a user equipment (UE);
   allocating resources at a mobile edge computing platform to the application resource request in lieu of a server of the cloud-computing services that is reachable via an internet connection, wherein a data latency between the UE and the mobile edge computing platform is less than a data latency between the UE and the server of the cloud-computing services at least due to proximity of the mobile edge computing platform to the UE;
   monitoring a traffic path of application data communicated to and from the UE for changes to the traffic path; and
   upon detecting a change in the traffic path,
      sending a notification to a mobile edge orchestrator via the mobile edge computing platform and a mobile edge platform manager; and
      relocating resources to a different mobile edge computing platform for improving latency or quality of service for the application data.

2. The method of claim 1, wherein the monitoring the traffic path comprises monitoring one or more data fields of data packets received from the UE, or sent to the UE, using a traffic filter.

3. The method of claim 2, wherein the monitoring using the traffic filter comprises monitoring at least one of the following fields: source address of a data packet, destination address of the data packet, source port of the data packet, destination port of the data packet, source tunnel address of the data packet, destination tunnel address of the data packet, source tunnel port of the data packet and destination tunnel port of the data packet.

4. The method of claim 2, wherein the monitoring using the traffic filter comprises monitoring fields for a specific value or a range of values.

5. The method of claim 1, wherein the relocating includes, selectively based on a type of application, capturing a current state of the application and communicating the current state of the application to the different mobile edge computing platform.

6. The method of claim 5, further comprising:
   synchronizing an operational state of the application between the mobile edge computing platform and the different mobile edge computing platform.

7. The method of claim 1, wherein the mobile edge computing platform is located at an access point for a bearer network used by the UE for data communication or at a gateway server serving the bearer network.

8. The method of claim 7, further comprising:
   providing, by one or more mobile edge hosts, computational, storage and network resources to the UE based on the application resource request.

9. The method of claim 8, further comprising:
   selecting, by a mobile edge platform manager and a mobile edge orchestrator, from among a plurality of mobile edge hosts, the one or more mobile edge hosts based on at least some parameters of an application for which the application resource request is received.

10. The method of claim 8, wherein the computational, storage and network resources are allocated from a virtualization infrastructure wherein the virtualization infrastructure performs functions including one or more of executing traffic rules, routing traffic among various applications running on the virtualization infrastructure, and providing domain name service to data traffic.

11. An apparatus for wireless communication, comprising:
   a mobile edge computing platform configured to:
      receive an application resource request for cloud-computing services from a user equipment (UE);
      allocate resources to the application resource request in lieu of a server of the cloud-computing services that is reachable via an internet connection, wherein a data latency between the UE and the mobile edge computing platform is less than a data latency between the UE and the server of the cloud-computing services at least due to proximity of the mobile edge computing platform to the UE;
      monitor a traffic path of application data communicated to and from the UE for changes to the traffic path; and
      upon detecting a change in the traffic path, send a notification to a mobile edge orchestrator via the mobile edge computing platform and a mobile edge platform manager; and relocate resources to a different mobile edge computing platform for improving latency or quality of service for the application data.

12. The apparatus of claim 11, wherein the monitoring the traffic path comprises monitoring one or more data fields of data packets received from the UE, or sent to the UE, using a traffic filter.

13. The apparatus of claim 12, wherein the traffic filter is configured to monitor at least one of the following fields: source address of a data packet, destination address of the data packet, source port of the data packet, destination port of the data packet, source tunnel address of the data packet, destination tunnel address of the data packet, source tunnel port of the data packet and destination tunnel port of the data packet.

14. The apparatus of claim 12, wherein the traffic filter is configured to monitor fields for a specific value or a range of values.

15. The apparatus of claim 11, wherein the relocating includes, selectively based on a type of application, capturing a current state of the application and communicating the current state of the application to the different mobile edge computing platform.

16. The apparatus of claim 15, wherein the mobile edge computing platform is further configured to synchronize an operational state of the application between the mobile edge computing platform and the different mobile edge computing platform.

17. The apparatus of claim 11, wherein the mobile edge computing platform is located at an access point for a bearer network used by the UE for data communication or at a gateway server serving the bearer network.

18. The apparatus of claim 17, further comprising:
one or more mobile edge hosts configured to provide computational, storage and network resources to the UE based on the application resource request.

19. The apparatus of claim 18, further comprising:
a mobile edge platform manager and a mobile edge orchestrator configured to select, from among a plurality of mobile edge hosts, the one or more mobile edge hosts based on at least some parameters of an application for which the application resource request is received.

20. The apparatus of claim 18, wherein the computational, storage and network resources are allocated from a virtualization infrastructure wherein the virtualization infrastructure performs functions including one or more of executing traffic rules, routing traffic among various applications running on the virtualization infrastructure, and providing domain name service to data traffic.

21. A computer program product comprising a non-volatile, computer-readable medium having code stored thereupon, the code, when executed by a processor, causing the processor to execute a method for wireless communication, the method comprising:
receiving an application resource request for a cloud-computing services from a user equipment (UE);
allocating resources at a mobile edge computing platform to the application resource request in lieu of a server of the cloud-computing services that is reachable via an internet connection, wherein a data latency between the UE and the mobile edge computing platform is less than a data latency between the UE and the server of the cloud-computing services at least due to proximity of the mobile edge computing platform to the UE;
monitoring a traffic path of application data communicated to and from the UE for changes to the traffic path; and
upon detecting a change in the traffic path,
sending a notification to a mobile edge orchestrator via the mobile edge computing platform and a mobile edge platform manager; and
relocating resources to a different mobile edge computing platform for improving latency or quality of service for the application data.

22. The computer program product of claim 21, wherein the monitoring the traffic path comprises monitoring one or more data fields of data packets received from the UE, or sent to the UE, using a traffic filter.

23. The computer program product of claim 22, wherein the monitoring using the traffic filter comprises monitoring at least one of the following fields: source address of a data packet, destination address of the data packet, source port of the data packet, destination port of the data packet, source tunnel address of the data packet, destination tunnel address of the data packet, source tunnel port of the data packet and destination tunnel port of the data packet.

24. The computer program product of claim 22, wherein the monitoring using the traffic filter comprises monitoring fields for a specific value or a range of values.

25. The computer program product of claim 21, wherein the relocating includes, selectively based on a type of application, capturing a current state of the application and communicating the current state of the application to the different mobile edge computing platform.

26. The computer program product of claim 25, the method further comprising:
synchronizing an operational state of the application between the mobile edge computing platform and the different mobile edge computing platform.

27. The computer program product of claim 21, wherein the mobile edge computing platform is located at an access point for a bearer network used by the UE for data communication or at a gateway server serving the bearer network.

28. The computer program product of claim 27, the method further comprising:
providing, by one or more mobile edge hosts, computational, storage and network resources to the UE based on the application resource request.

29. The computer program product of claim 28, the method further comprising:
selecting, by a mobile edge platform manager and a mobile edge orchestrator, from among a plurality of mobile edge hosts, the one or more mobile edge hosts based on at least some parameters of an application for which the application resource request is received.

30. The computer program product of claim 28, wherein the computational, storage and network resources are allocated from a virtualization infrastructure wherein the virtualization infrastructure performs functions including one or more of executing traffic rules, routing traffic among various applications running on the virtualization infrastructure, and providing domain name service to data traffic.

* * * * *